US010147390B2

(12) United States Patent
Yang et al.

(10) Patent No.: US 10,147,390 B2
(45) Date of Patent: Dec. 4, 2018

(54) SUB-PIXEL RENDERING METHOD

(71) Applicants: BOE Technology Group Co., Ltd., Beijing (CN); Beijing BOE Optoelectronics Technology Co., Ltd., Beijing (CN)

(72) Inventors: Kai Yang, Beijing (CN); Peng Liu, Beijing (CN); Renwei Guo, Beijing (CN); Hao Zhang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/320,850

(22) PCT Filed: Apr. 8, 2016

(86) PCT No.: PCT/CN2016/078846
§ 371 (c)(1),
(2) Date: Feb. 27, 2018

(87) PCT Pub. No.: WO2016/188237
PCT Pub. Date: Dec. 1, 2016

(65) Prior Publication Data

US 2018/0166042 A1 Jun. 14, 2018

(30) Foreign Application Priority Data

May 27, 2015 (CN) .......................... 2015 1 0278916

(51) Int. Cl.
*G09G 5/02* (2006.01)
*G09G 3/20* (2006.01)
(Continued)

(52) U.S. Cl.
CPC ................ *G09G 5/02* (2013.01); *G09G 3/20* (2013.01); *G09G 3/2074* (2013.01); *G09G 2300/0452* (2013.01); *G09G 2340/0457* (2013.01)

(58) Field of Classification Search
CPC combination set(s) only.
See application file for complete search history.

(56) References Cited

U.S. PATENT DOCUMENTS

2003/0002732 A1* 1/2003 Gossett ..................... G06T 5/20
382/164
2003/0210834 A1 11/2003 Hitchcock et al.
(Continued)

FOREIGN PATENT DOCUMENTS

CN 102568376 A 7/2012
CN 103366683 A 10/2013
(Continued)

OTHER PUBLICATIONS

Jul. 1, 2016—(WO) International Search Report and Written Opinion Appn PCT/CN2016/078846 with English Tran.

*Primary Examiner* — Wesner Sajous
(74) *Attorney, Agent, or Firm* — Banner & Witcoff, Ltd.

(57) ABSTRACT

This application discloses a sub-pixel rendering method, and relates to the field of displaying. It is capable of making improvement with respect to the problem of distortion in the boundary region of the displayed image while ensuring a relatively high resolution of the display. The sub-pixel rendering method comprises: receiving a digital image; dividing, according to color values of image pixels in the digital image, the image pixels into boundary region pixels and continuous region pixels; generating a plurality of screen pixels on a screen, each screen pixel at least including one red sub-pixel, one blue sub-pixel, and one green sub-pixel, one of the plurality of screen pixels being used for
(Continued)

correspondingly displaying one of the image pixels; wherein adjacent screen pixels for displaying the continuous region pixels share sub-pixels, and each screen pixel for displaying the boundary region pixels exclusively uses its sub-pixels.

11 Claims, 4 Drawing Sheets

(51) Int. Cl.

| | |
|---|---|
| ***G09G 3/36*** | (2006.01) |
| ***H04N 1/60*** | (2006.01) |
| ***G06T 11/00*** | (2006.01) |
| ***H04N 5/57*** | (2006.01) |

(56) References Cited

U.S. PATENT DOCUMENTS

| | | | | |
|---|---|---|---|---|
| 2006/0158466 | A1 | 7/2006 | Chien et al. | |
| 2007/0205972 | A1* | 9/2007 | Asao | G09G 3/3614 345/88 |
| 2015/0356903 | A1* | 12/2015 | Lee | G09G 3/2003 345/600 |
| 2016/0055780 | A1* | 2/2016 | Guo | G09G 3/2003 345/55 |

FOREIGN PATENT DOCUMENTS

| | | | |
|---|---|---|---|
| CN | 103956134 | A | 7/2014 |
| CN | 104461440 | A | 3/2015 |
| CN | 104821147 | A | 8/2015 |

* cited by examiner

The first threshold equals to 0.6

The first threshold equals to 0.7

The first threshold equals to 0.75

The first threshold equals to 0.8

The first threshold equals to 0.85

The first threshold equals to 0.9

SUB-PIXEL RENDERING METHOD

The application is a U.S. National Phase Entry of International Application No. PCT/CN2016/078846 filed on Apr. 08, 2016, designating the United States of America and claiming priority to Chinese Patent Application No. 201510278916.8 filed on May 27, 2015. The present application claims priority to and the benefit of the above-identified applications and the above-identified applications are incorporated by reference herein in their entirety.

TECHNICAL FIELD

The present disclosure relates to the field of displaying, and more particularly, to a sub-pixel rendering method.

BACKGROUND

In order to show a real image in the nature from a display, first of all, the real image needs to be converted into a digital image acceptable to the display, the digital image is a digitalized image that is represented, in terms of space, as a limited number of image pixels distributed discretely and, in terms of color, as a limited number of color values (the color values are a red value, a green value, and a blue value) distributed discretely. After the real image is converted into the digital image, there is still a need to drive a plurality of sub-pixels arranged in an array in the display according to the digital image, so as to show the real image from the display.

In the conventional sub-pixel driving method, as shown in FIG. 1, one red sub-pixel, one green sub-pixel, and one blue sub-pixel in a dotted frame constitute one screen pixel, and one screen pixel is used to correspondingly display one image pixel. At the time of displaying, taking that a screen pixel “A” displays an image pixel “a” as an example, a red sub-pixel 1, a green sub-pixel 3, and a blue sub-pixel 2 of the screen pixel “A” are loaded with a red value, a green value, and a blue value of the image pixel “a”, respectively, so as to complete displaying of the image pixel “a”. It can be seen that when displaying by adopting the conventional sub-pixel driving method, one sub-pixel is used to display a corresponding color of one image pixel. For the aim of displaying more image pixels, that is, improving resolution of the display, there is a need to increase the number of sub-pixels on the screen. However, because of limits of manufacturing process, when the number of sub-pixels on the screen reaches a certain extent, it is hard to continue increasing the number of sub-pixels on the screen, when it reaches a certain extent, which results in the fact that it is hard to continue improving resolution of the display.

A sub-pixel rendering method may be adopted to increase resolution of the display without increasing the number of sub-pixels on the screen of the display. In the sub-pixel rendering method, as shown in FIG. 2, one red sub-pixel, one green sub-pixel, and one blue sub-pixel in a dotted frame constitute one screen pixel, and one screen pixel is used to correspondingly display one image pixel. What is different from the conventional sub-pixel driving method is: adjacent screen pixels share sub-images at the time of displaying. Explanation is provided by taking that a screen pixel C and a screen pixel D share the blue sub-pixel 2 as an example. The screen pixel C corresponds to the image pixel “m”, and the screen pixel D corresponds to the image pixel “n”. When data is loaded, a red value and a green value of the image pixel “m” are loaded onto the red sub-pixel 1 and the green sub-pixel 3 respectively; a red value and a green value of the image pixel “n” are loaded onto the red sub-pixel 4 and the green sub-pixel 5 respectively; and an average of a blue value of the image pixel “m” and a blue value of the image pixel “n” is loaded onto the blue sub-pixel 2. When an array of sub-pixels is lightened, through the light mixing effect, the screen pixel C and the screen pixel D complete displaying of the image pixel “m” and the image pixel “n”, respectively, so that sharing of the blue sub-pixel 2 is achieved. It can be known from the above that, by adopting the sub-pixel rendering method, sub-pixel sharing between adjacent screen pixels can be achieved, so that when displaying the same number of image pixels, adopting the sub-pixel rendering method saves the number of sub-pixels used in comparison to the conventional sub-pixel driving method. In other words, when there are the same number of sub-pixels on the screen, by adopting the sub-pixel rendering method, it is possible for the display to attain a higher resolution in comparison to the conventional sub-pixel driving method.

However, since color at a boundary region of the digital image changes relatively fast, a problem of distortion in the boundary region of a displayed image arises when adopting the sub-pixel rendering method. The reason for this distortion problem are as follows: the image pixel “m” and the image pixel “n” are two adjacent image pixels located in the boundary region of the digital image, and a difference of blue value between the image pixel “m” and the image pixel “n” is relatively large; when the image pixel “m” and the image pixel “n” are displayed respectively by the screen pixel C and the screen pixel D shown in FIG. 2, the blue value of the image pixel “m” and the blue value of the image pixel “n” are both presented by the blue sub-pixel 2; thus, in the displayed image, the screen pixel C and the screen pixel D cannot accurately display a difference of blue color between the image pixel m and the image pixel n, which results in the fact that the displayed image cannot accurately show an original contrast in the boundary region of the digital image, leading to distortion in the boundary region of the displayed image.

SUMMARY

In view of the above problem, the present disclosure aims to provide a sub-pixel rendering method capable of making improvement with respect to the problem of distortion in the boundary region of the displayed image while ensuring a relatively high resolution of the display.

According to an embodiment of the present disclosure, there is provided a sub-pixel rendering method, comprising: receiving a digital image; dividing, according to color values of image pixels in the digital image, the image pixels into boundary region pixels and continuous region pixels; generating a plurality of screen pixels on a screen, each screen pixel at least including one red sub-pixel, one blue sub-pixel, and one green sub-pixel, one of the plurality of screen pixels being used to correspondingly display one of the image pixels; at the time of displaying, adjacent screen pixels for displaying the continuous region pixels share sub-pixels, and each screen pixel for displaying the boundary region pixels exclusively uses its sub-pixels.

It can be known from the above technical solution that, when displaying by adopting the sub-pixel rendering method provided by the present disclosure, image pixels that constitute a digital image are divided into boundary region pixels and continuous region pixels, wherein screen pixels for displaying the continuous region pixels are referred to as first screen pixels, adjacent first screen pixels may share sub-pixels. In comparison to the conventional sub-pixel driving method, the number of sub-pixels that are used is saved, which enables the display to have a higher resolution. In addition, screen pixels for displaying the boundary region pixels are referred to second screen pixels. The second screen pixels exclusively use their sub-pixels, so that the second screen pixels can accurately express original color information of the boundary region pixels, which enables the displayed image to display an original contrast in the boundary region of the digital image. Accordingly, improvement can be made with respect to the problem of distortion in the boundary region of the displayed image in comparison to the existing sub-pixel rendering method.

BRIEF DESCRIPTION OF THE DRAWINGS

In order to illustrate the technical solutions in the embodiments of the present disclosure more clearly, drawings necessary for describing the embodiments will be briefly introduced below, obviously, the following drawings are parts of embodiments of the present disclosure, and for those of ordinary skill in the art, it is possible to obtain other drawings based on these drawings without paying creative efforts.

DETAILED DESCRIPTION OF THE EMBODIMENTS

Hereinafter, the technical solutions in the embodiments of the present disclosure will be described clearly and comprehensively in combination with the drawings thereof, obviously, the embodiments described are merely parts of the embodiments of the present disclosure, rather than all the embodiments thereof.

Figure 1:
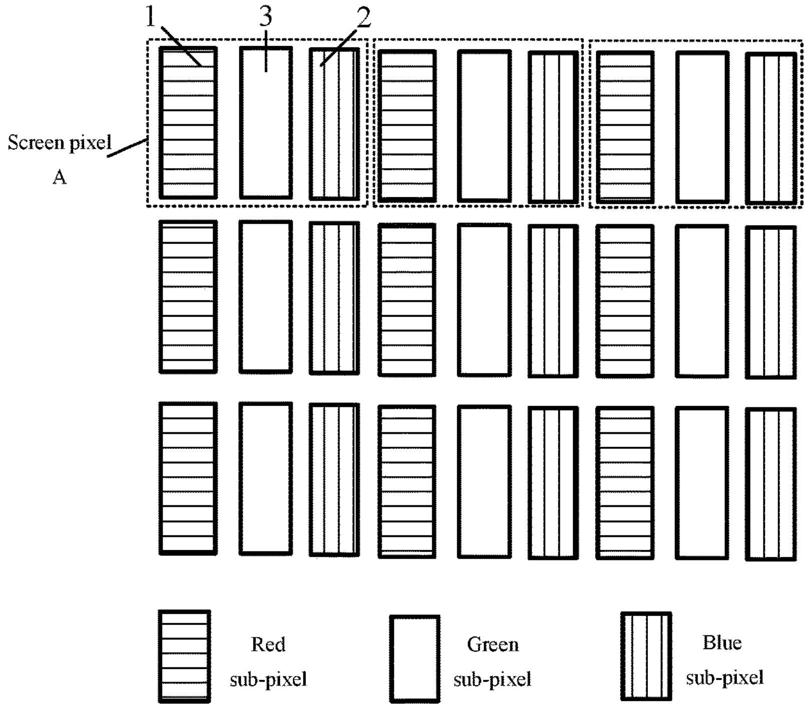
FIG. 1 (Prior Art)
FIG. 1 is a diagram of distribution of screen pixels when adopting the conventional sub-pixel driving method to display.
Figure 2:
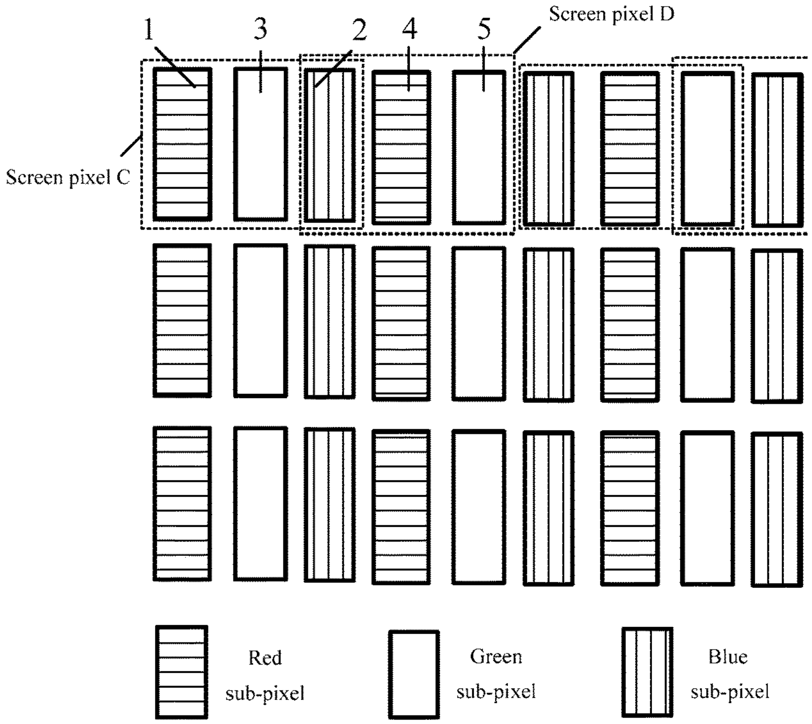
FIG. 2 (Prior Art)
FIG. 2 is a diagram of distribution of screen pixels when adopting a sub-pixel rendering method to display in the prior art.
Figure 3:
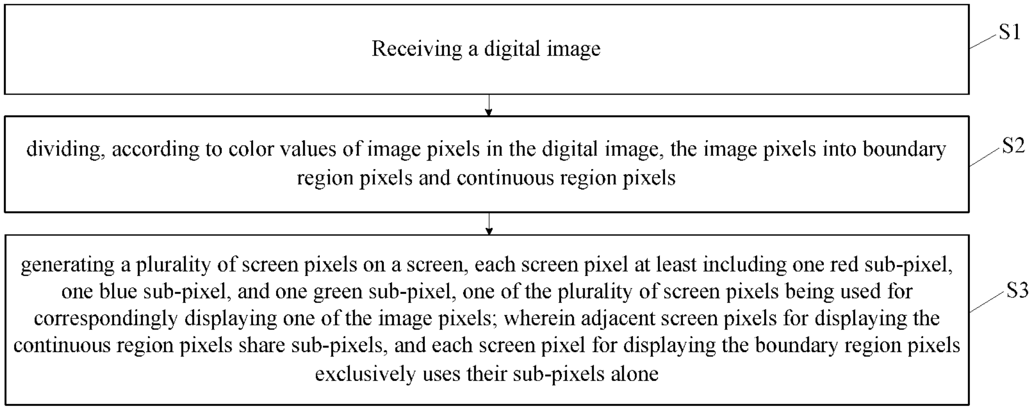
FIG. 3 is a flowchart of a sub-pixel rendering method provided by an embodiment of the present disclosure.

Referring to FIG. 3, a schematic flowchart of a sub-pixel rendering method provided by an embodiment of the present is shown.

In step S1, a digital image is received. Exemplarily, a driving chip of a display receives a digital image outputted from a central processor or a graphic processor.

In step S2, according to color values of image pixels in the digital image, the image pixels are divided into boundary region pixels and continuous region pixels. A boundary region is a region in the digital image where color values change relatively fast, and a continuous region is a region in the digital image where color values change relatively slow. In step S2, boundary region pixels are image pixels located in the boundary region of the digital image, and continuous region pixels are image pixels located in the continuous region of the digital image. In a specific implementation, in step S2, each image pixel is classified into a boundary region pixel or a continuous region pixel according to distribution of color values in a surrounding region of each image pixel, which aims to differentially display the boundary region pixels and the continuous region pixels of the digital image in step S3.

In step S3, a plurality of screen pixels are generated on a screen, each screen pixel at least includes one red sub-pixel, one blue sub-pixel, and one green sub-pixel. One screen pixel is used to correspondingly display one image pixel. Thereafter, at the time of displaying, adjacent screen pixels for displaying the continuous region pixels share sub-pixels, and each screen pixel for displaying the boundary region pixels exclusively uses its sub-pixels.

In a specific implementation of this step, a plurality of adjacent sub-pixels (including at least one red sub-pixel, one blue sub-pixel, and one green sub-pixel) on the screen constitute one screen pixel, so that a plurality of screen pixels are generated on the screen, wherein each screen pixel correspondingly displays one image pixel. When displaying the digital image processed by step S2, adjacent screen pixels corresponding to the continuous region pixels share sub-pixels, whereas screen pixels corresponding to the boundary region pixels exclusively use their sub-pixels. In other words, there are common sub-pixels among a plurality of sub-pixels of the screen pixels for displaying the continuous region of the digital image, whereas there are no common sub-pixels among a plurality of sub-pixels of the screen pixels for displaying the boundary region of the digital image.

It can be known from the above that, when displaying by adopting the sub-pixel rendering method provided by this embodiment, there are common sub-pixels among a plurality of sub-pixels of the screen pixels for displaying the continuous region of the digital image. Thus, it is capable of saving the number of sub-pixels used in comparison to the conventional sub-pixel driving method, which enables the display to have a higher resolution. In addition, the screen pixels for displaying the boundary region of the digital image exclusively use their sub-pixels, so that the screen pixels for displaying the boundary region of the digital image can accurately display color information of the boundary region of the digital image, which enables the display to accurately display an original contrast in the boundary region of the digital image, accordingly, in comparison to the existing sub-pixel rendering method, improvement with respect to the problem of distortion in the boundary region of the displayed image can be made by adopting the sub-pixel rendering method provided by this embodiment.

In addition, as a preferred specific implementation, the display automatically completes operations of step S2 under the control of algorithms provided in the driving chip of the display, so as to achieve a conversion from a digital image to a displayed image more conveniently and more rapidly.

In a specific implementation, in step S2, there may be multiple modes of implementation to divide image pixels into boundary region pixels and continuous region pixels. For example, reference may be made to knowledge related to edge detection in the field of image processing to determine a specific mode of dividing image pixels into boundary region pixels and continuous region pixels.

In order to effectively make improvement to the problem of distortion in the boundary region of the displayed image, in this embodiment, as an example, operations of step S2 may be implemented as below.

Figure 4:
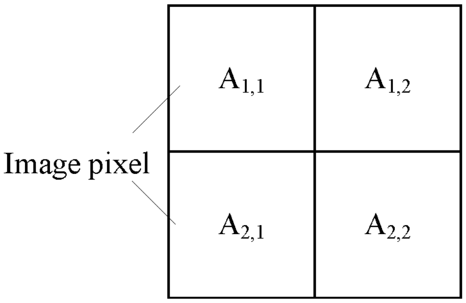
FIG. 4 is a schematic diagram of distribution of four image pixels distributed in a Four-Patch provided by an embodiment of the present disclosure.
Figure 5:
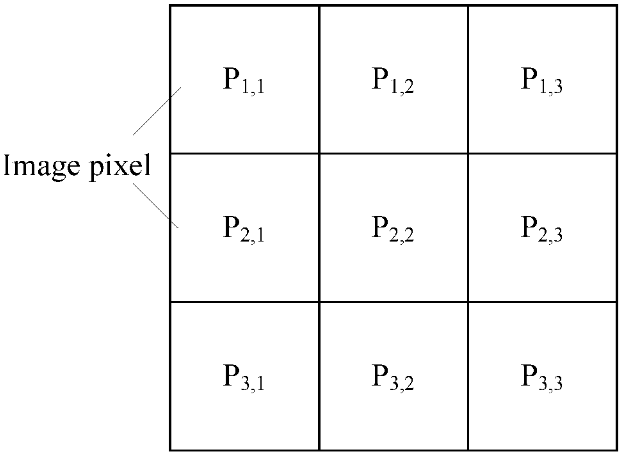
FIG. 5 is a schematic diagram of distribution of nine image pixels distributed in a Nine-Patch provided by an embodiment of the present disclosure.

In a digital image, a plurality of image pixels distributed with a first rule are selected, and boundary region pixels in the plurality of selected image pixels are determined according to distribution of color values of the selected plurality of image pixels. For example, the first rule is a Four-Patch or a Nine-Patch. For convenience of comprehension, as shown in FIG. 4, $A_{1,1}$, $A_{1,2}$, $A_{2,1}$, $A_{2,2}$ are four image pixels distributed in a Four-Patch, as shown in FIG. 5, $P_{1,1}$, $P_{1,2}$, $P_{1,3}$, $P_{2,1}$, $P_{2,2}$, $P_{2,3}$, $P_{3,1}$, $P_{3,2}$, $P_{3,3}$ are nine image pixels distributed in a Nine-Patch.

A plurality of image pixels distributed with the first rule are selected repeatedly, until each image pixel in the digital image is divided into a boundary region pixel or a continuous region pixel.

In this step, by means of analyzing distribution of color values of the selected plurality of image pixels, image pixels with obvious color value change are determined as boundary region pixels, reference may be made to related knowledge associated with edge detection in the filed of image processing for details, to which this embodiment makes no limitation.

By sequentially selecting a plurality of image pixels distributed with the first rule, it is possible to determine whether each of the plurality of image pixels distributed with the first rule in the digital image is a boundary region pixel, so as to determine all of the boundary region pixels in the digital image.

In addition, when determining whether an arbitrary image pixel is a boundary region pixel, distribution of color values in a surrounding region with this image pixel as a center is considered (except image pixels located at an edge of the digital image), so that it can be determined more accurately whether this image pixel is a boundary region pixel, accordingly, all of the boundary region pixels in the digital image can be determined more accurately.

Next, at the time of displaying, boundary region pixels and continuous region pixels of the digital image may be displayed differently, so that the aim of making improvement with respect to a distortion phenomenon in the boundary region can be achieved.

The above color values may be at least one of a red value, a blue value, and a green value. In order to determine boundary region pixels of the digital image more accurately, when determining a boundary of a color image, it is possible to determine boundary region pixels of the digital image with respect to the red value, the blue value, or the green value, respectively.

For example, as for the red value, the above color value is set as the red value to perform a first determination of boundary region pixels in the digital image, so as to determine boundary region pixels in the digital image. For convenience of description, a set of these boundary region pixels is referred to as a set A.

Next, as for the blue value, the above color value is as the blue value to perform a second determination of boundary region pixels in the digital image, so as to determine boundary region pixels in the digital image. For convenience of description, a set of these boundary region pixels is referred to as a set B.

Thereafter, as for the green value, the above color value may be set as the green value to perform a third determination of boundary region pixels in the digital image, so as to determine boundary region pixels in the digital image. For convenience of description, a set of these boundary region pixels is referred to as a set C.

Last, a set sum of the set A, the set B, and the set C is determined as boundary region pixels. The above described method can determine boundary region pixels in the digital image more accurately, so that a distortion phenomenon in the boundary region of the display image can be improved to a large extent at the time of displaying, and a display quality can be improved.

Hereinafter, cases where the first rule is, respectively, a Four-Patch and a Nine-Patch will be explained in detail through a First Embodiment and a Second Embodiment.

First Embodiment

As shown in FIG. 4, as for the plurality of image pixels $A_{1,1}$, $A_{1,2}$, $A_{2,1}$, $A_{2,2}$ distributed in a Four-Patch, an image pixel $A_{1,1}$ located in a corner of the Four-Patch is used as a reference point, of course, the other image pixels may also be taken as the reference point, which can also implement determination of boundary region pixels, no limitations are made herein. Thereafter, an image pixel $A_{1,2}$ parallel to the image pixel that is used as the reference point in the Four-Patch is taken as a first image pixel; an image pixel $A_{2,1}$ vertical to the image pixel that is used as the reference point in the Four-Patch is taken as a second image pixel; and an image pixel $A_{2,2}$ inclined towards the image pixel that is used as the reference point in the Four-Patch is taken as a third image pixel.

As shown in FIG. 4, the first image pixel $A_{1,2}$ is an image pixel parallel to the image pixel $A_{1,1}$ that is used as the reference pixel in the Four-Patch; the second pixel $A_{2,1}$ is an image pixel vertical to the image pixel $A_{1,1}$ that is used as the reference pixel in the Four-Patch; and the third pixel $A_{2,2}$ is an image pixel tilted towards the image pixel $A_{1,1}$ that is used as the reference pixel in the Four-Patch.

Next, a color value difference between each of the first image pixel, the second image pixel, and the third image pixel and the image pixel $A_{1,1}$ that is used as the reference point is calculated and an absolute value is obtained, respectively. Thereafter the absolute value is divided by a color value of the image pixel $A_{1,1}$ that is used as the reference point, so as to obtain a quotient corresponding to the image pixel. For convenience of comprehension, description is provided by taking the image pixel $A_{1,2}$ as an example, a color value of the image pixel $A_{1,1}$ and a color value of the image pixel $A_{1,2}$ are $C_1$, $C_2$ respectively, then the quotient corresponding to the image pixel $A_{1,2}$ is $|C_1-C_2|/C_1$.

Thereafter, boundary region pixels in the Four-Patch are determined according to a quotient corresponding to the first image pixel, a quotient corresponding to the second image pixel, a quotient corresponding to the third image pixel, and a first threshold.

Herein, the quotient corresponding to the first image pixel $A_{1,2}$, the quotient corresponding to the second image pixel $A_{2,1}$, and the quotient corresponding to the third image pixel $A_{2,2}$ are t1, t2, t3 respectively, and the first threshold is m, whose value range is 0.6 to 0.9. Boundary region pixels in the Four-Patch may be determined in accordance with the following rules:

if t1, t2, t3 are all less than or equal to m or t1, t2, t3 are all larger than m, it is determined that there are no boundary region pixels in the Four-Patch;

if t1 is larger than m and t2, t3 are both less than or equal to m, the image pixel $A_{1,1}$ that is used as the reference point and the first image pixel $A_{1,2}$ is determined as boundary region pixels;

if t2 is larger than m and t1, t3 are both equal to or less than m, the image pixel $A_{1,1}$ that is used as the reference point and the second image pixel $A_{2,1}$ is determined as boundary region pixels;

if t3 is larger than m and t1, t2 are both equal to or less than m, the image pixel $A_{1,1}$ that is used as the reference point and the third image pixel $A_{2,2}$ is determined as boundary region pixels;

if t1 is less than or equal to m and t2, t3 are both larger than m, the second image pixel $A_{2,1}$ and the third image pixel $A_{2,2}$ is determined as boundary region pixels;

if t2 is less than or equal to m and t1, t3 are both larger than m, the first image pixel $A_{1,2}$ and the third image pixel $A_{2,2}$ is determined as boundary region pixels; and if t3 is less than or equal to m and t1, t2 are both larger than m, the first image pixel $A_{1,2}$ and the second image pixel $A_{2,1}$ is determined as boundary region pixels.

For convenience of description, the boundary region determination method in the First Embodiment is referred to as a Four-Patch boundary determination method. The Four-Patch boundary determination method is relatively simple, and can be easily implemented through algorithms provided in the driving chip of the display. When this boundary determination method is implemented through algorithms provided in the driving chip of the display, manufacturing process of the aforesaid driving chip is relatively simple, and a higher yield rate can be achieved.

Figures 6, 7:
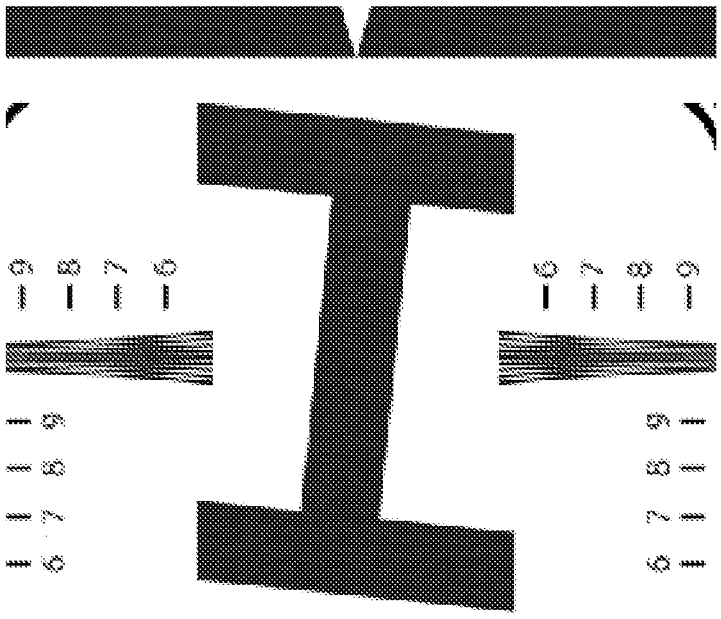
FIG. 6 is a diagram of implementation effect of adopting a Four-Patch boundary determination method to determine when a first threshold has a different value.
FIG. 7 is a diagram of an image whose boundary is to be determined provided by an embodiment of the present disclosure.
Figure 8:
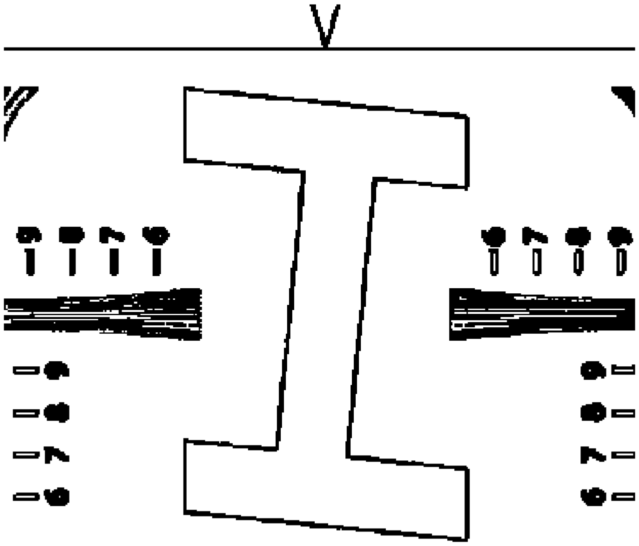
FIG. 8 is a diagram of implementation effect of adopting a Four-Patch boundary determination method to recognize the boundary region of the image shown in FIG. 7 provided by an embodiment of the present disclosure.

In addition, as shown in FIG. 6, a dark portion in this figure indicates the boundary region (i.e., the region composed by the boundary region pixels) determined by the Four-Patch boundary determination method, and it can be seen that when the value of the first threshold is different, the boundary region determined by the Four-Patch boundary determination method is different, so that the value range of the first threshold can be optimized to obtain a more accurate boundary region. The inventor of the present application has made many optimization experiments and obtained the following conclusion: when the value range of the first threshold is 0.6 to 0.9, a more accurate boundary region of the digital image can be obtained. To verify accuracy of the above conclusion, see FIGS. 7 and 8, FIG. 7 being an image whose boundary is to be determined. When the first threshold has a value of 0.6, the boundary region determined by adopting the Four-Patch boundary determination method for the image in FIG. 7 is as shown in the black region in FIG. 8, from which it can be seen that, the determined boundary region is substantially coincident with the boundary region of FIG. 7.

Second Embodiment

Figure 9:
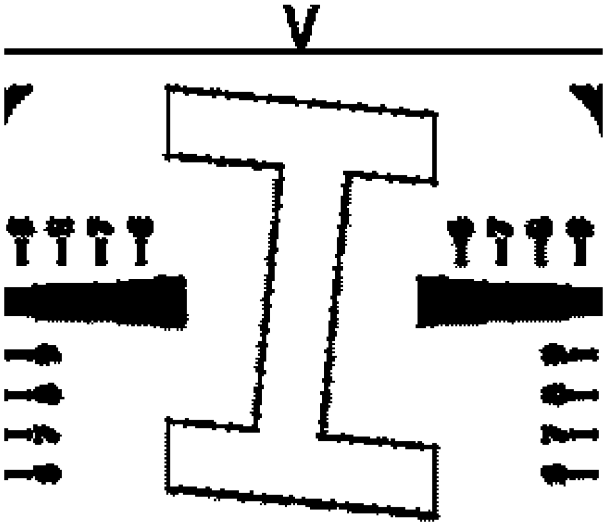
FIG. 9 is a diagram of implementation effect of adopting a Nine-Patch boundary determination method to recognize the boundary region of the image shown in FIG. 7 provided by an embodiment of the present disclosure.

As for the plurality of image pixels $P_{1,1}$, $P_{1,2}$, $P_{1,3}$, $P_{2,1}$, $P_{2,2}$, $P_{2,3}$, $P_{3,1}$, $P_{3,2}$, $P_{3,3}$ distributed in a Nine-Patch as shown in FIG. 9, the plurality of image pixels distributed in the Nine-Patch are divided into a horizontal group, a vertical group, a left diagonal group, and a right diagonal group, wherein the horizontal group includes a central image pixel $P_{2,2}$ and two image pixels located at the left side and the right side of the central image pixel $P_{2,2}$; the vertical group includes the central image pixel $P_{2,2}$ and two image pixels located at the upper side and the lower side of the central image pixel $P_{2,2}$; the left diagonal group includes the central image pixel $P_{2,2}$ and two image pixels located at the upper left side and the lower right side of the central image pixel $P_{2,2}$; and the right diagonal group includes the central image pixel $P_{2,2}$ and two image pixels located at the lower left side and the upper right side of the central image pixel $P_{2,2}$. Specifically, the horizontal group includes the image pixel $P_{2,1}$, the image pixel $P_{2,2}$, and the image pixel $P_{2,3}$; the vertical group includes the image pixel $P_{1,2}$, the image pixel $P_{2,2}$, and the image pixel $P_{3,2}$; the left diagonal group includes the image pixel $P_{1,1}$, the image pixel $P_{2,2}$, and the image pixel $P_{3,3}$; and the right diagonal group includes the image pixel $P_{1,3}$, the image pixel $P_{2,2}$, and the image pixel $P_{3,1}$.

Next, a dispersion of color values of three image pixels in each group among the horizontal group, the vertical group, the left diagonal group, and the right diagonal group is calculated according to a first dispersion calculation formula, to obtain a first dispersion value for each group respectively; and a dispersion of all of the first dispersion values is calculated according to a second dispersion calculation formula, to obtain a second dispersion value. For convenience of description, the first dispersion corresponding to the horizontal group, the first dispersion corresponding to the vertical group, the first dispersion corresponding to the left diagonal group, and the first dispersion corresponding to the right diagonal group are $G_{11}$, $G_{21}$, $G_{31}$, $G_{41}$ respectively, and the obtained second dispersion value is G11.

Thereafter, a dispersion of color values of three image pixels in each group among the horizontal group, the vertical group, the left diagonal group, and the right diagonal group is calculated according to a third dispersion calculation formula, to obtain one third dispersion value for each group respectively; and a dispersion of all of the third dispersion values is calculated according to the second dispersion calculation formula, to obtain one fourth dispersion value; wherein, the first dispersion calculation formula is different from the third dispersion calculation formula. For convenience of description, the third dispersion corresponding to the horizontal group, the third dispersion corresponding to the vertical group, the third dispersion corresponding to the left diagonal group, and the third dispersion corresponding to the right diagonal group are $G_{51}$, $G_{61}$, $G_{71}$, $G_{81}$ respectively, and the obtained fourth dispersion value is G12.

Last, boundary region pixels in the Nine-Patch may be determined in accordance with the following rules:

in a case where the second dispersion value G11 and the fourth dispersion value G12 are both larger than the second threshold, respective image pixels that satisfy a first requirement in the image pixel group is determined as boundary region pixels, the first requirement referring to that a first dispersion value to which one group of image pixels corresponds is a minimum among all of the first dispersion values (all of the first dispersion values are: $G_{11}$, $G_{21}$, $G_{31}$, $G_{41}$); and in other cases, it is determined that there are no boundary region pixels in the Nine-Patch.

The second threshold is a predetermined value. A magnitude of the second threshold determines a degree of strictness for determination of the boundary region pixels. Specifically, when the second threshold has a relatively large value, determination of the boundary region pixels is relatively strict, only a relatively small number of image pixels are allowed to be determined as boundary region pixels, and vice versa.

For convenience of description, the boundary region determination method in the Second Embodiment is referred to as a Nine-Patch boundary determination method. The Nine-Patch boundary determination method is relatively simple, and can be easily implemented through algorithms provided in the driving chip of the display. When this boundary determination method is implemented through algorithms provided in the driving chip of the display, manufacturing process of the aforesaid driving chip is relatively simple, and a higher yield rate can be achieved.

The first dispersion calculation formula in the above Nine-Patch boundary determination method may be $$G=|C_1-C_2|+|C_1-C_3| \quad \text{Formula 1}$$

where G represents a dispersion, $C_1$ represents a color value of a central image pixel, and $C_2$, $C_3$ represent color values of two image pixels other than the central image pixel in an image pixel group;

the third dispersion calculation formula may be $$G=((C_1-\text{Mean})^2+(C_2-\text{Mean})^2+(C_3-\text{Mean})^2)^{1/2} \quad \text{Formula 2}$$

where $\text{Mean}=(C_1+C_2+C_3)/3$;

the second dispersion calculation formula may be $$G=((G_1-\text{Min})^2+(G_2-\text{Min})^2+(G_3-\text{Min})^2+(G_4-\text{Min})^2)^{1/2}/3/\text{Min} \quad \text{Formula 3}$$

where G1, G2, G3, G4 represent a set of numeric values of a dispersion to be calculated, and Min represents a minimum among G1, G2, G3, G4.

It's worth mentioning that, in the Nine-Patch boundary determination method, when the first dispersion calculation formula is Formula 1, the second dispersion calculation formula is Formula 2, and the second dispersion calculation formula is Formula 3, the value of the second threshold preferably is 0.6. As shown in FIGS. 7 and 9, FIG. 7 is an image whose boundary is to be determined, the boundary region determined by adopting the Nine-Patch boundary determination method for the image in FIG. 7 is shown in the black region in FIG. 9, from which it can be seen that, the boundary region of the digital image can be determined more accurately by the Nine-Patch boundary determination method in this embodiment.

The respective embodiments in this specification are described by a progressive way. The same or similar portions between the respective embodiments can be referred mutually. Each embodiment emphasizes on its differences from the other embodiments.

Those of ordinary skill in the art will appreciate that all or parts of flows in the above method in the embodiments may be completed through hardware associated with computer programs. Said programs may be stored in a computer readable storage medium. When the programs are executed, flows in the above method in the embodiments may be included. The storage medium may be a magnetic disk, an optical disk, a read-only memory (ROM), or a random access memory (RAM) etc.

The above described are merely some embodiments of the present disclosure. However, the protection scope of the present disclosure is limited thereto. Modifications or replacements that are easily conceivable for those skilled in the art within the technique range disclosed in the present disclosure should all fall into the protection scope of the present disclosure. The protection scope of the present disclosure is determined by the appended claims.

The present application claims the priority of the Chinese patent application with an application number of 201510278916.8 and an invention title of "A SUB-PIXEL RENDERING METHOD" filed on May 27, 2015, which is incorporated as part of the present application by reference herein in its entirety.

What is claimed is:

1. A sub-pixel rendering method, performed by a driving chip of a display, comprising:

receiving, by the driving chip of said display, a digital image;

dividing, according to color values of image pixels in the digital image, the image pixels into boundary region pixels and continuous region pixels; and generating a plurality of screen pixels on a screen, each screen pixel at least including one red sub-pixel, one blue sub-pixel, and one green sub-pixel, one of the plurality of screen pixels being used to correspondingly display one of the image pixels, wherein adjacent screen pixels for displaying the continuous region pixels share sub-pixels, and each screen pixel for displaying the boundary region pixels exclusively uses its own subpixels.

2. The sub-pixel rendering method according to claim 1, wherein dividing the image pixels into boundary region pixels and continuous region pixels comprises:

selecting a plurality of image pixels distributed with a first rule from among the digital image, and dividing, according to a distribution of color values of the selected plurality of image pixels, the selected plurality of image pixels into boundary region pixels and continuous region pixels.

3. The sub-pixel rendering method according to claim 2, wherein the first rule is a Four-Patch or a Nine-Patch.

4. The sub-pixel rendering method according to claim 2, wherein the color values are at least one of a red value, a blue value, and a green value.

5. The sub-pixel rendering method according to claim 3, wherein as for a plurality of image pixels distributed in the Four-Patch, determining the boundary region pixels among the plurality of image pixels comprises:

with an image pixel located in a corner of the Four-Patch being used as a reference point, an image pixel parallel to the image pixel that is used as the reference point in the Four-Patch being taken as a first image pixel, an image pixel vertical to the image pixel that is used as the reference point in the Four-Patch being taken as a second image pixel, and an image pixel inclined towards the image pixel that is used as the reference point in the Four-Patch being taken as a third image pixel, calculating a color value difference between each of the first image pixel, the second image pixel, and the third image pixel and the image pixel that is used as the reference point, and obtaining an absolute value, thereafter dividing the absolute value by a color value of the image pixel that is used as the reference point, so as to obtain a quotient corresponding to the image pixel; and determining boundary region pixels in the Four-Patch according to a quotient corresponding to the first image pixel, a quotient corresponding to the second image pixel, a quotient corresponding to the third image pixel, and a first threshold.

6. The sub-pixel rendering method according to claim 5, wherein the first threshold is in a value range of 0.6 to 0.9.

7. The sub-pixel rendering method according to claim 3, wherein as for a plurality of image pixels distributed in the Nine-Patch, dividing the plurality of image pixels distributed in a Nine-Patch into a horizontal group, a vertical group, a left diagonal group, and a right diagonal group;

calculating, according to a first dispersion calculation formula, a dispersion of color values of three image pixels in each group among the horizontal group, the vertical group, the left diagonal group, and the right diagonal group respectively to obtain a first dispersion value for each group respectively; and calculating, according to a second dispersion calculation formula, a dispersion of all of the first dispersion values to obtain a second dispersion value;

calculating, according to a third dispersion calculation formula, a dispersion of color values of three image pixels in each group among the horizontal group, the vertical group, the left diagonal group, and the right diagonal group respectively to obtain a third dispersion value for each group respectively; and calculating, according to the second dispersion calculation formula, a dispersion of all of the third dispersion values to obtain a fourth dispersion value, wherein the first dispersion calculation formula is different from the third dispersion calculation formula; and determining boundary region pixels in the Nine-Patch according to the second dispersion value, the fourth dispersion value, and a second threshold.

8. The sub-pixel rendering method according to claim 7, wherein in a case where the second dispersion value and the fourth dispersion value both are larger than the second threshold, determining respective image pixels that satisfy a first requirement as boundary region pixels, the first requirement referring to that a first dispersion value to which one group of image pixels corresponds is a minimum among all of the first dispersion values; and in other cases, determining that there are no boundary region pixels in the Nine-Patch.

9. The sub-pixel rendering method according to claim 7, wherein the first dispersion calculation formula is $$G=|C_1-C_2|+|C_1-C_3|$$

where G represents a dispersion, $C_1$represents a color value of a central image pixel in each group, and $C_2$, $C_3$represent color values of two image pixels other than the central image pixel in each group;

the third dispersion calculation formula is $$G=((C_1-\text{Mean})^2+(C_2-\text{Mean})^2+(C_3-\text{Mean})^2)^2)^{1/2}$$

where $\text{Mean}=(C_1+C_2+C_3)/3$; and the second dispersion calculation formula is $$G=((G_1-\text{Min})^2+(G_2-\text{Min})^2+(G_3-\text{Min})^2+(G_4-\text{Min})\mathbf{2})^{1/2}/3/\text{Min}$$

where G1, G2, G3, G4 represent a set of numeric values of a dispersion to be calculated, and Min represents a minimum among G1, G2, G3, G4.

10. The sub-pixel rendering method according to claim 7, wherein the second threshold has a value of 0.6.

11. The sub-pixel rendering method according to claim 8, wherein the second threshold has a value of 0.6.

* * * * *